(12) United States Patent
Kulkarni et al.

(10) Patent No.: US 9,464,607 B2
(45) Date of Patent: Oct. 11, 2016

(54) INTEGRALLY-MOLDED INTAKE MANIFOLD CONNECTOR FOR ENGINE COVER OF COMBUSTION ENGINE

(71) Applicant: FORD GLOBAL TECHNOLOGIES, LLC, Dearborn, MI (US)

(72) Inventors: Milind B. Kulkarni, Canton, MI (US); John C. Lohr, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 101 days.

(21) Appl. No.: 14/525,578

(22) Filed: Oct. 28, 2014

(65) Prior Publication Data

US 2016/0115918 A1    Apr. 28, 2016

(51) Int. Cl.

| F02B 33/00 | (2006.01) |
|---|---|
| *F02M 35/104* | (2006.01) |
| *B60K 13/02* | (2006.01) |
| *F02M 35/10* | (2006.01) |
| F02M 29/04 | (2006.01) |
| F02B 1/04 | (2006.01) |
| F02M 1/00 | (2006.01) |
| F02M 29/06 | (2006.01) |
| F02M 27/08 | (2006.01) |

(52) U.S. Cl.
CPC ............ *F02M 35/104* (2013.01); *B60K 13/02* (2013.01); *F02M 35/10242* (2013.01); *F02M 35/10321* (2013.01); *F02B 1/04* (2013.01); *F02M 1/00* (2013.01); *F02M 27/08* (2013.01); *F02M 29/04* (2013.01); *F02M 29/06* (2013.01)

(58) Field of Classification Search
CPC ...... F02M 29/04; F02M 29/06; F02M 27/08; F02M 1/00; F02B 1/04

USPC .......................................................... 123/590
See application file for complete search history.

(56) References Cited

U.S. PATENT DOCUMENTS

| 4,234,198 A * | 11/1980 | Martin ................... F16J 15/024 |
|---|---|---|
| | | 277/598 |
| 6,182,633 B1 | 2/2001 | Rauch |
| 6,199,530 B1 | 3/2001 | Brassell et al. |
| 6,705,268 B2 | 3/2004 | Homsi et al. |

(Continued)

FOREIGN PATENT DOCUMENTS

| CN | 202927260 U | 5/2013 |
|---|---|---|
| CN | 203476552 U | 3/2014 |

(Continued)

*Primary Examiner* — Hung Q Nguyen
*Assistant Examiner* — Charles Brauch
(74) *Attorney, Agent, or Firm* — Gregory P. Brown; MacMillan, Sobanski & Todd, LLC (57) ABSTRACT

An engine cover system for joining a cover with an intake manifold body. A plurality of structural ribs project from an external surface of the body including a pair of parallel ribs. Each parallel rib carries an integrally-molded U-shaped receiver strip extending transversely from the parallel ribs to form slots having closed ends proximate a first edge of the body and slot openings defined by respective edges of the receiver strips. The engine cover is comprised of a shroud, first and second radial arms, and first and second hinge pins projecting from the first and second radial arms, respectively. The hinge pins are configured to slide into the slots via the slot openings into the closed ends. First and second elastomeric ferrules are installed on the first and second hinge pins, respectively, configured to be compressed by the receiver strips when captured at the closed ends.

6 Claims, 7 Drawing Sheets

(56) References Cited

U.S. PATENT DOCUMENTS

| | | |
|---|---|---|
| 6,739,302 B2 | 5/2004 | Jones et al. |
| 7,631,630 B2 | 12/2009 | Sedlar et al. |
| 8,550,049 B2 | 10/2013 | Lohr |
| 8,607,756 B1 | 12/2013 | Kulkarni et al. |
| 8,651,081 B2 | 2/2014 | Newman et al. |
| 8,794,203 B2 | 8/2014 | Smith |
| 2004/0110429 A1 | 6/2004 | Wizgall |
| 2004/0194750 A1* | 10/2004 | Tanikawa .......... F02M 35/10039 123/184.42 |
| 2010/0326395 A1* | 12/2010 | Lohr ................ F02M 35/10045 123/198 E |

FOREIGN PATENT DOCUMENTS

| | | |
|---|---|---|
| EP | 1430215 B1 | 12/2008 |
| JP | 2005248788 | 9/2005 |
| WO | 2013108704 A1 | 7/2013 |

* cited by examiner

INTEGRALLY-MOLDED INTAKE MANIFOLD CONNECTOR FOR ENGINE COVER OF COMBUSTION ENGINE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to decorative covers installed on internal combustion engines for automotive vehicles, and, more specifically, to the mounting of an engine cover to an air intake manifold.

The engine compartment of a vehicle presents various challenges for vehicle engineers and designers in providing functionality, serviceability, and aesthetics in a relatively small space. Consideration must also be given to manufacturing and assembly costs in addition to weight, which ultimately impacts fuel economy, to deliver a competitive product. An engine cover is typically used in order to enhance the overall appearance of the engine compartment and to reduce the propagation of engine noise. Injection molded polymers are commonly used to fabricate an engine cover.

The mounting of a engine cover to an engine typically is comprised of several steel brackets, fasteners, or other joining structures such as hooks or clamps. The use of several intermediate components which attach on one side to the engine cover and on the other side to an engine component (e.g., an air intake manifold or a cam cover) creates many potential sites for NVH (noise, vibration, and harshness) problems such as squeak and rattle. A relatively large part count leads to added part costs and an associated increase in manufacturing/assembly costs.

The air intake manifold which directs incoming air to the respective engine cylinders of a combustion engine has historically been fabricated from metal. More recently, various molded materials including thermoplastics, resins, and polymers have been used to manufacture intake manifolds. Preferred materials may include nylon or other polyamides which may further include filler materials such as glass fibers. A switch to plastic materials has achieved a reduction in weight, but reliance on brackets and fasteners with a high parts count have continued.

SUMMARY OF THE INVENTION

In one aspect of the invention, a combustion engine system comprises an intake manifold body comprised of molded polyamide defining a plurality of runners and an air intake passage. A plurality of structural ribs project from an external surface of the body including a pair of parallel ribs oriented longitudinally and having rib ends juxtaposed with a first edge of the body. Each parallel rib carries an integrally-molded U-shaped receiver strip extending transversely from the parallel ribs to form slots having closed ends proximate the first edge and slot openings defined by respective edges of the receiver strips. An engine cover is comprised of a shroud, first and second radial arms extending from the shroud at a first end, and first and second hinge pins projecting from the first and second radial arms, respectively, wherein the hinge pins are configured to slide into the slots via the slot openings into the closed ends. First and second elastomeric ferrules are installed on the first and second hinge pins, respectively, configured to be compressed by the receiver strips when captured at the closed ends.

DETAILED DESCRIPTION OF PREFERRED EMBODIMENTS

Figure 1:
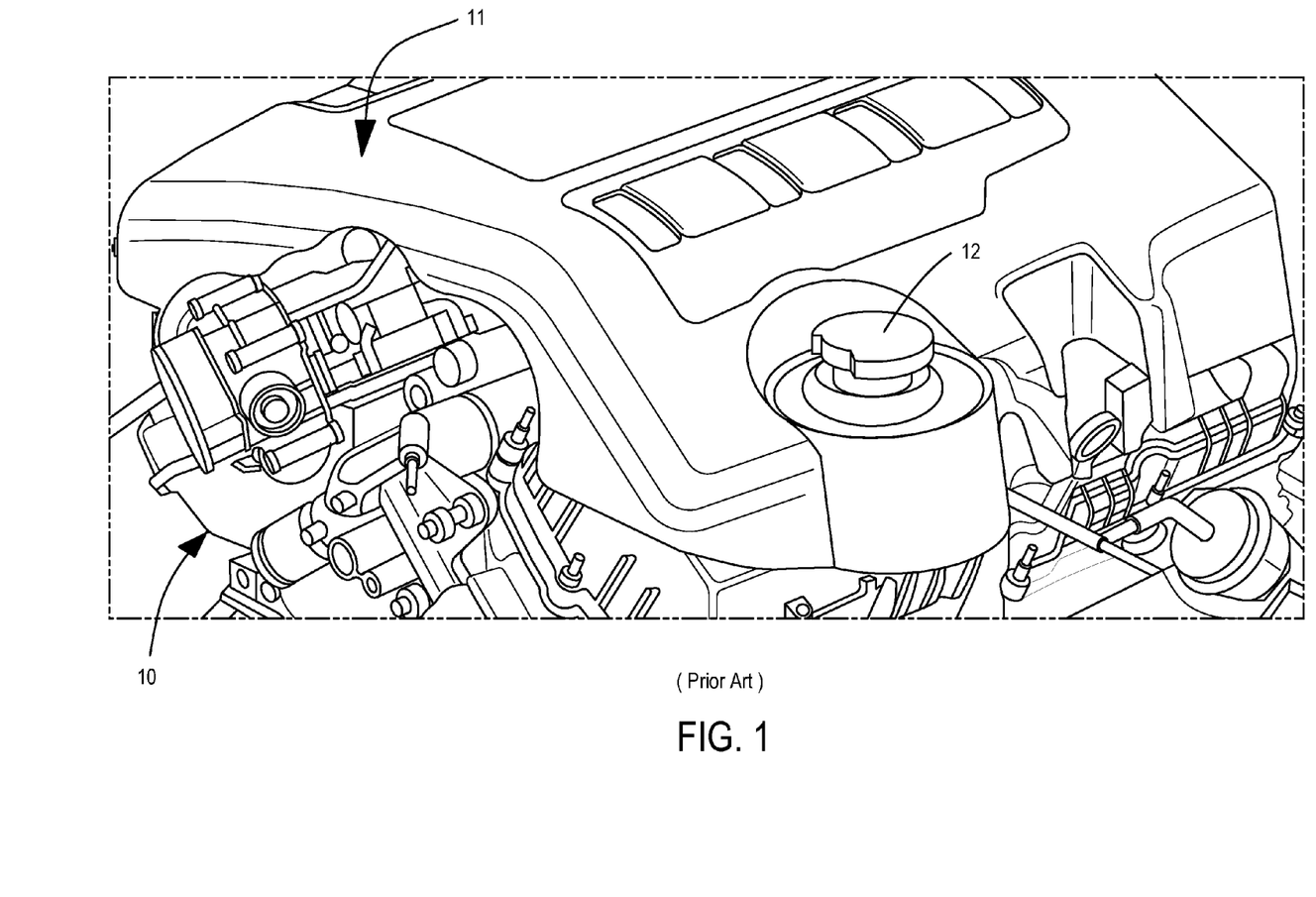
FIG. 1 is a partial perspective view of a prior art engine and engine cover.

Referring to FIG. 1, an internal combustion engine 10 supports an engine cover 11. Cover 11 may preferably be comprised of a molded polymeric material such as nylon, PVC, or polyurethane, for example. Cover 11 may include various details for accommodating features and accessories of engine 10, such as an oil port 12. Various brackets and/or fasteners are conventionally used to mount cover 11 to various structures of engine 10.

Figure 2:
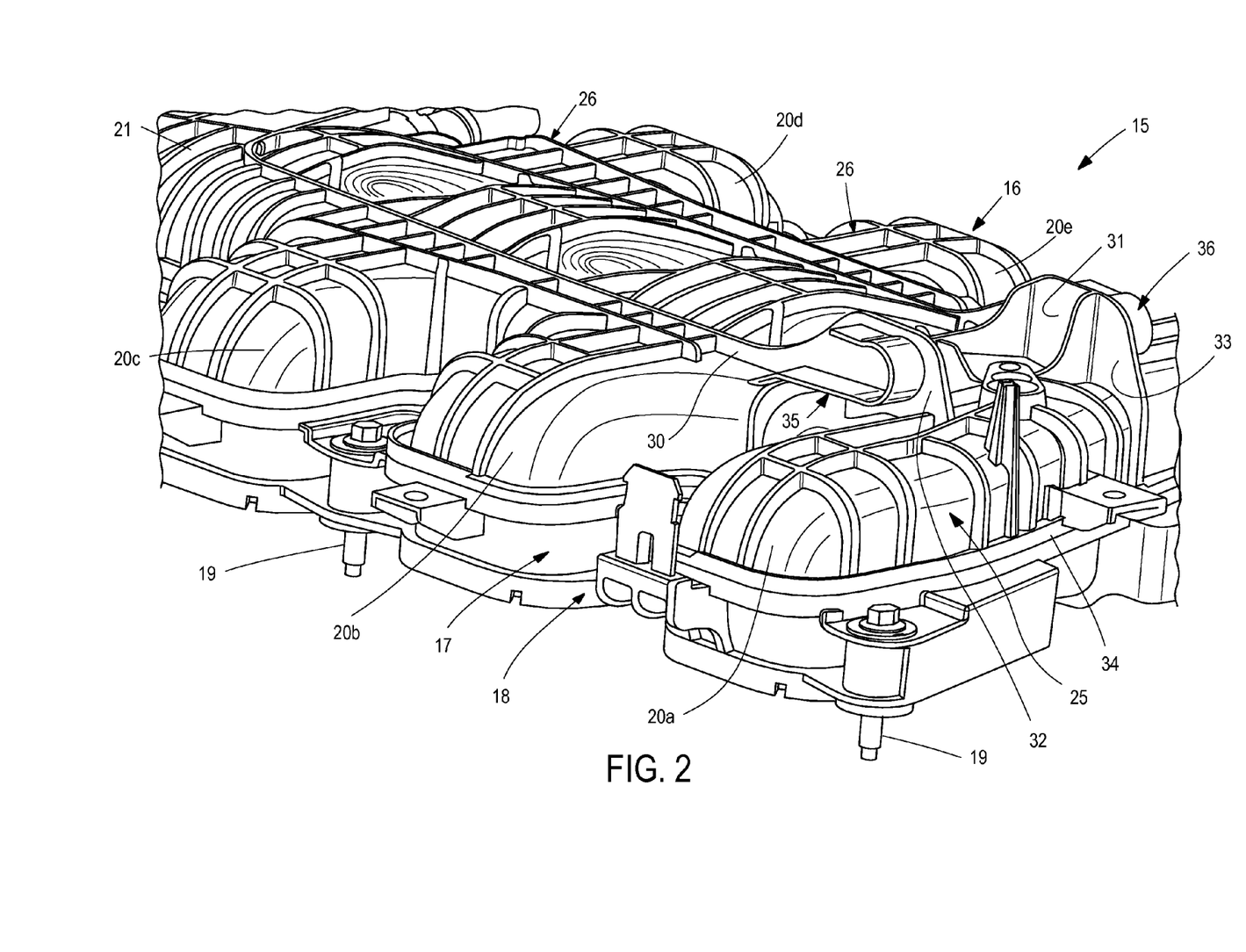
FIG. 2 is a perspective view of a molded body for an air intake manifold according to one preferred embodiment of the invention.
Figure 3:
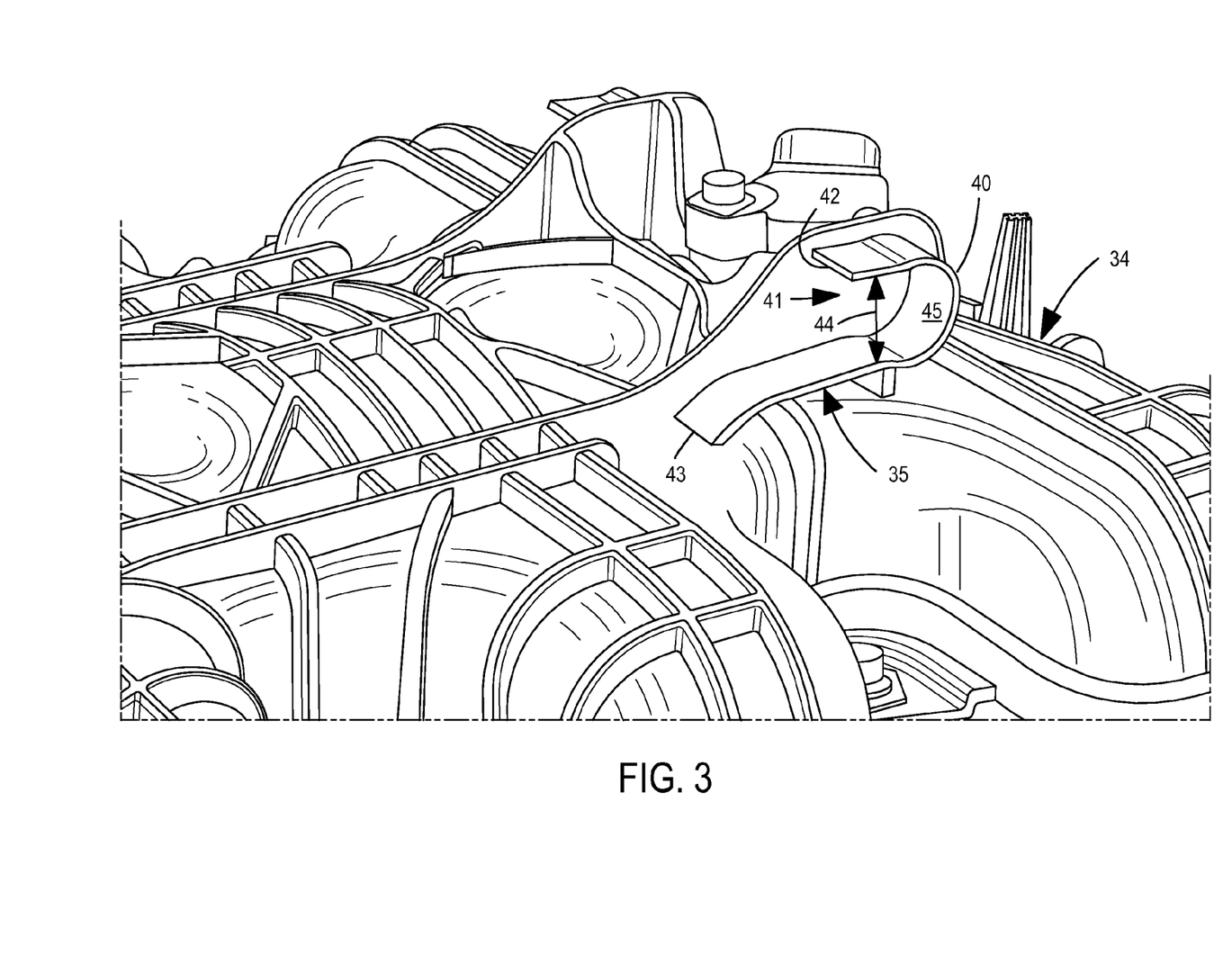
FIG. 3 is another perspective view of the molded body of FIG. 2.

FIGS. 2 and 3 show an air intake manifold 15 with integrally-molded features for attaching a cover which eliminates the need for a bracket and fasteners at a corresponding attachment location. As best seen in FIG. 2, intake manifold 15 is formed in separately molded sections including a upper manifold body 16, a lower manifold body 17, and a flange 18 which may be assembled and bolted to an engine block or head (not shown) by a plurality of bolts 19. Upper manifold body 16 is formed by injection molding a polyamide thermoplastic such as nylon, which may preferably include a filler material such as glass fiber. Body 16 defines a plurality of runners (of which runners 20a-20e are visible) and an air intake passage 21. Intake passage 21 distributes intake air between runners 20 via a plenum as known in the art.

For strengthening the body 16, an external surface 25 of body 16 includes a plurality of structural ribs 26 projecting outward from surface 25. Ribs are preferably configure to run along three dimensions for stiffening body 16 along different axes. Ribs 26 include a pair of parallel ribs 30 and 31 oriented longitudinally along body 16 having rib ends 32 and 33 juxtaposed in close proximity with a first edge 34 of body 16.

In order to form an integrally-molded attachment structure for mounting an engine cover (thereby avoiding the need for a bracket and fasteners), parallel ribs 30 and 31 carry integrally-molded U-shaped receiver strips 35 and 36 which extend transversely from ribs 30 and 31. Strips 35 and 36 are configured to form slots with respective open and closed ends for receiving a support for an engine cover as described below.

Referring to FIG. 3, U-shaped receiver strip 35 will be described in greater detail (such details also applying to receiver strip 36). Receiver strip 35 follows a U-shaped path creating a slot 41 with a closed end 40 which is proximate to first edge 34 of body 16. An open end of slot 41 is formed between edges 42 and 43 of receiver strip 35 for receiving a hinge pin on the engine cover as described below. Preferably, strip 35 follows a profile which provides an intermediate narrowing 44 in the width of slot 41, resulting in an expanded pocket 45 at closed end 40 to retain a hinge pin.

Figure 4:
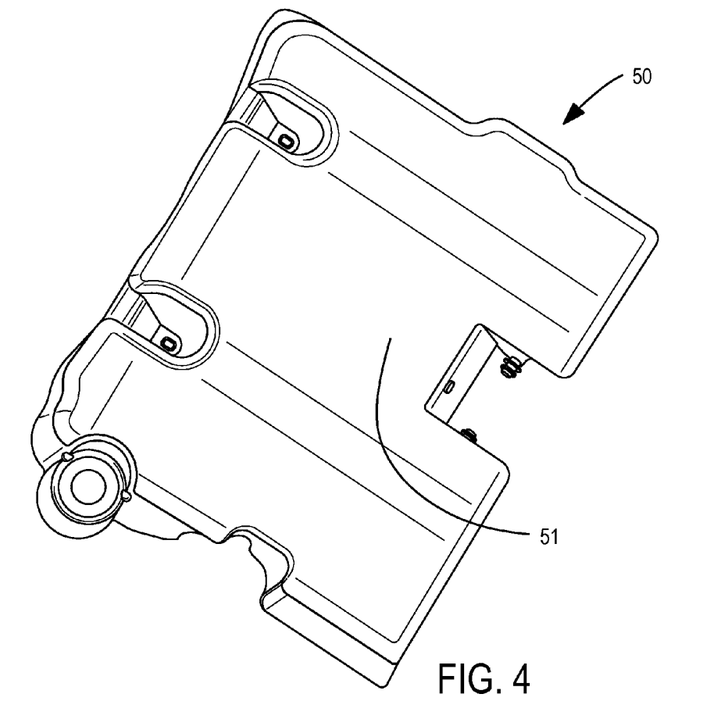
FIG. 4 is a top, perspective view of an engine cover according to one preferred embodiment of the invention.
Figure 5:
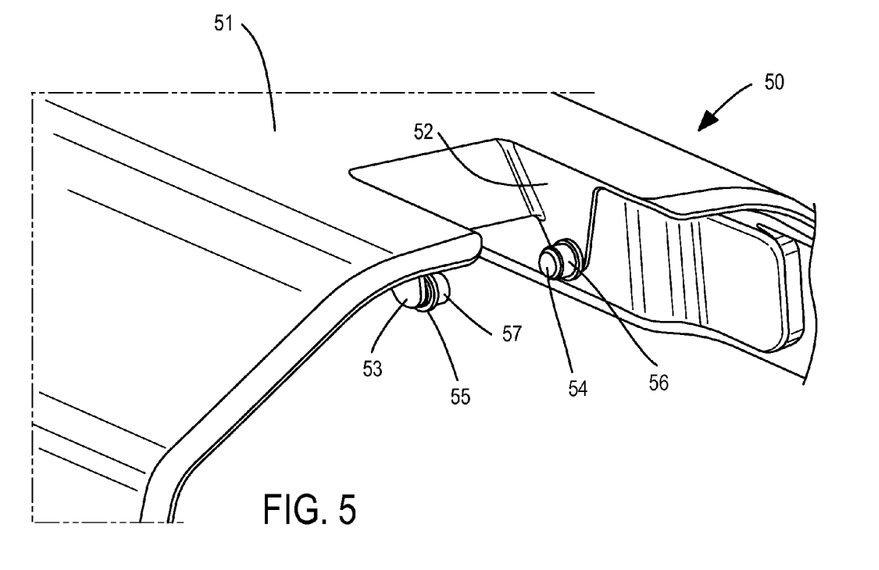
FIG. 5 is an end, perspective view of the engine cover of FIG. 4.

An engine cover 50 used with the integrally-formed bracket of intake manifold 16 is shown in FIGS. 4 and 5. Cover 50 has a shroud portion 51 to conceal at least a portion of the combustion engine including the intake manifold. First and second radial arms 52 and 53 extends from shroud 51 at a first end of cover 50 in order to locate first and second hinge pins 54 and 55 at a desired radial distance away from shroud 51 to provide a pivoting motion around the mutual axes of hinge pins 54 and 55. Hinge pins 54 and 55 are configured to slide into the slots defined by receiver strips 36 and 35 of intake manifold 16, respectively. Shroud 51, radial arms 52 and 53, and hinge pins 54 and 55 are preferably integrally molded as a single unit. In order to reduce vibrations when hinge pins 54 and 55 are received in the corresponding pockets at the closed ends of the receiver slots, each hinge pin 54 and 55 is covered by a respective first and second elastomeric ferrule or grommet 56 and 57. Ferrules 56 and 57 are preferably slightly compressed by the receiver strips when captured in the pockets at the closed ends. They may preferably be comprised of a compressible rubber or other elastomeric material, formed into a generally cylindrical shape for engaging in the respective receiver strips. Ferrules 56 and 57 may be installed on hinge pins 54 and 55 by stretching, for example.

Figure 6:
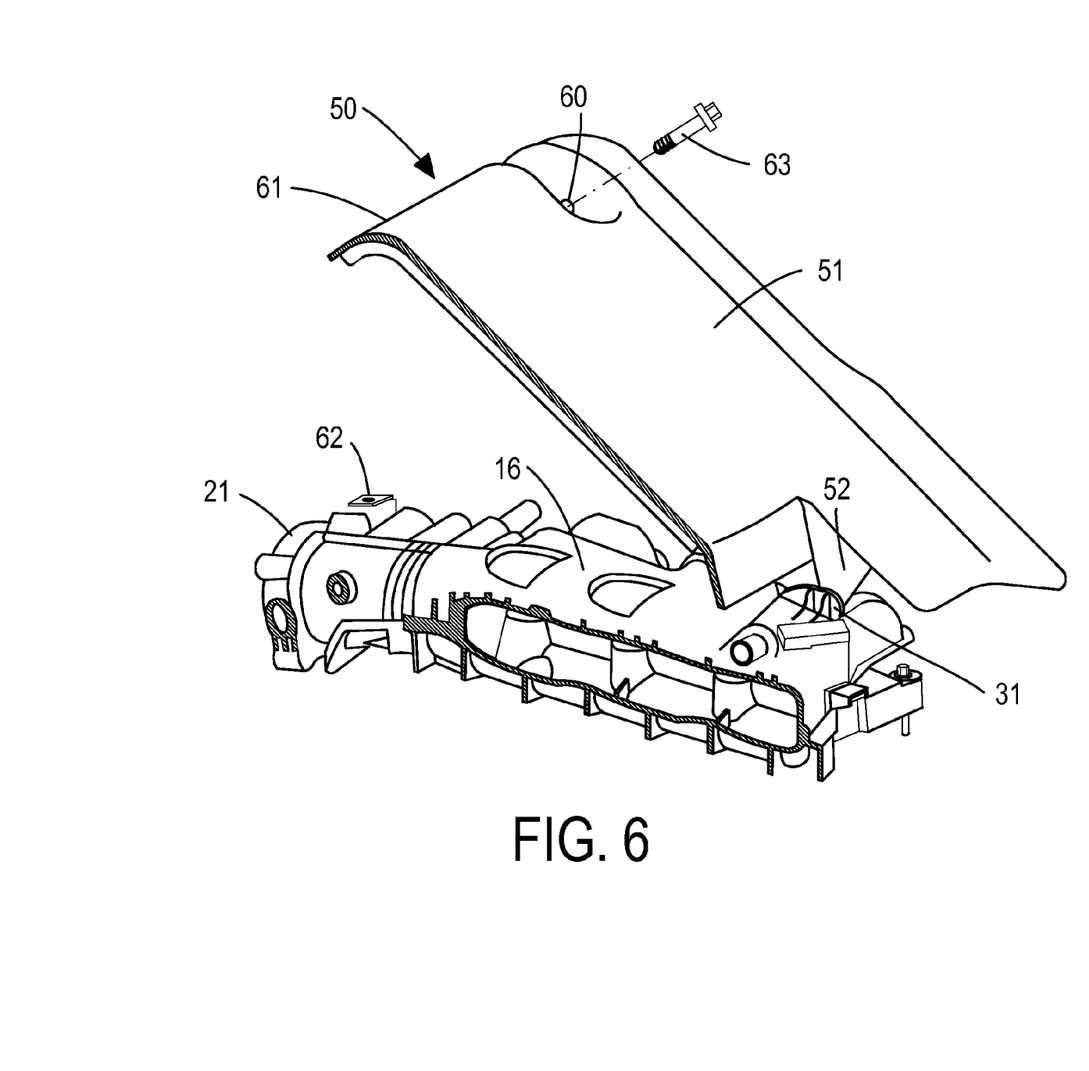
FIG. 6 is a partial cross-sectional, perspective view of the engine cover of FIG. 4 partially installed on the intake manifold body of FIG. 2.

FIG. 6 illustrates engine cover 50 as it is being installed on (or removed from) intake manifold body 16, wherein hinge pin 54 has been inserted into the receiver slot on rib 31 to be captured in the pocket at the closed end while keeping cover 50 oriented such that it is pivoted upward from body 16 at a second (opposite) end 61. With hinge pin 54 captured by the corresponding receiver strip, shroud 51 may then be pivoted downward toward intake manifold body 16 such that a fastening hole 60 at second end 61 of engine cover 50 becomes aligned with a threaded receptacle 62. Receptacle 62 may be incorporated into the intake manifold or may be provided by any other conveniently located structure of the engine, so that a threaded fastener 63 may be installed by passing through fastening hole 60 to selectively attach with receptacle 62. To incorporate a threaded receptacle 62 into intake manifold body 16, an insert molding process could be used, for example.

Figure 7:
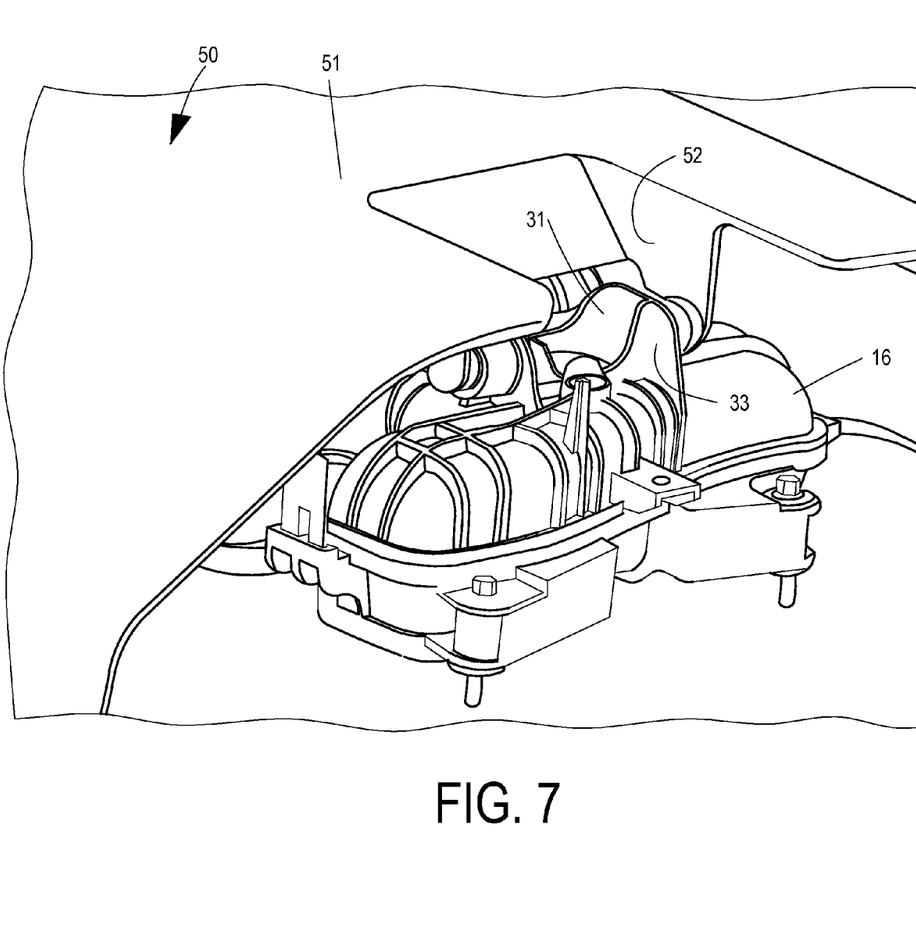
FIG. 7 is an end, perspective view of the engine cover of FIG. 4 fully installed on the intake manifold body of FIG. 2.
Figure 8:
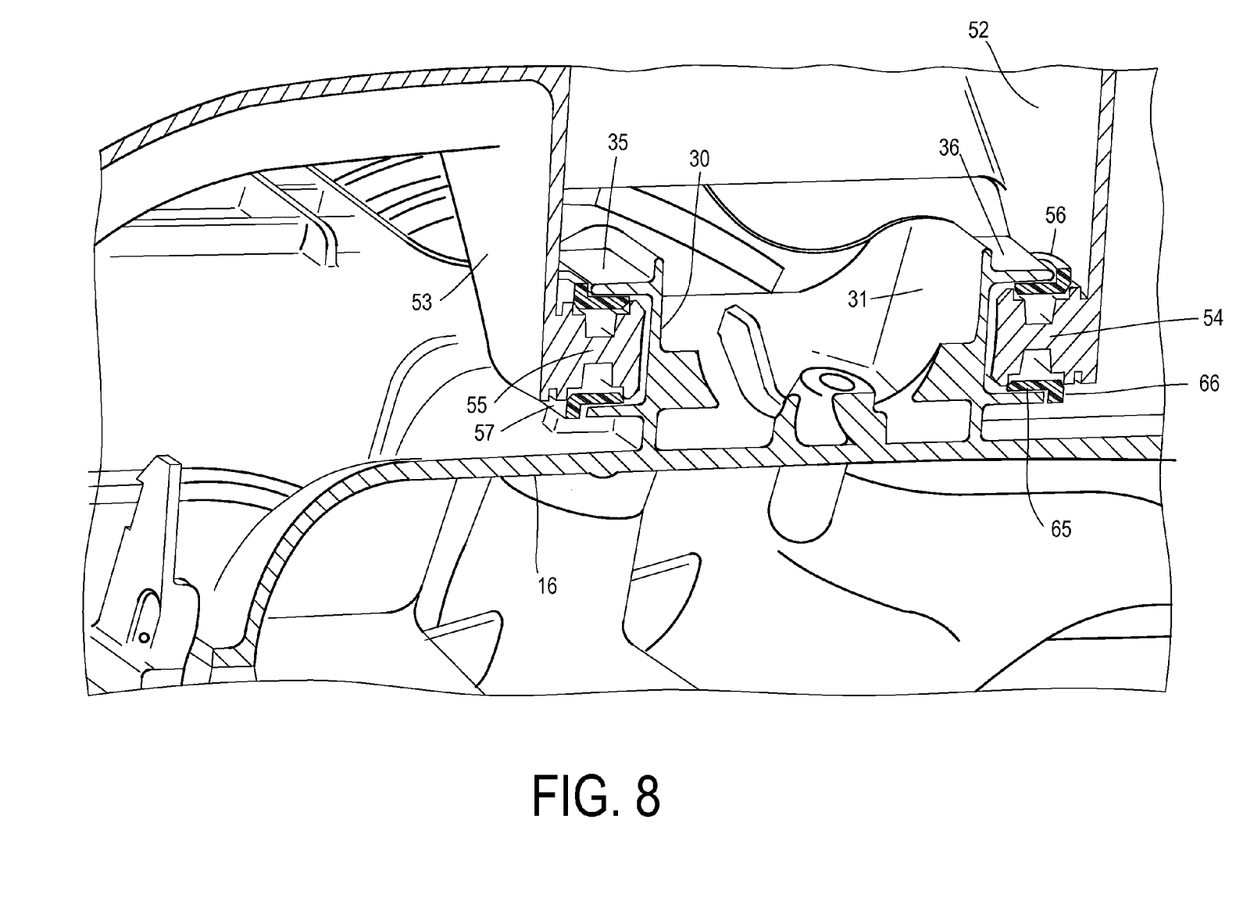
FIG. 8 is a cross-sectional view through the hinged connection of the engine cover of FIG. 4 with the intake manifold body of FIG. 2.

FIG. 7 shows the hinge pins captured in the respective receiver strips after cover 50 is pivoted to its installed position against the engine. FIG. 8 shows a cross-sectional view with hinge pins 54 and 55 installed between receiver strips 35 and 36 and showing elastomeric ferrules 56 and 57 captured on respective hinge pins 54 and 55. Ferrule 56 indicates a cylindrical body portion 65 and a flange portion 66 for engaging in receiver strip 36 which compress against strip 36 to eliminate squeak and rattle problems.

What is claimed is:

1. A combustion engine system comprising:
    an intake manifold body comprised of molded polyamide defining a plurality of runners and an air intake passage, wherein a plurality of structural ribs project from an external surface of the body including a pair of parallel ribs oriented longitudinally and having rib ends juxtaposed with a first edge of the body, wherein the parallel ribs each carry an integrally-molded U-shaped receiver strip extending transversely from the parallel ribs to form slots having closed ends proximate the first edge and slot openings defined by respective edges of the receiver strips;
    an engine cover comprised of a shroud, first and second radial arms extending from the shroud at a first end, and first and second hinge pins projecting from the first and second radial arms, respectively, wherein the hinge pins are configured to slide into the slots via the slot openings into the closed ends; and
    first and second elastomeric ferrules installed on the first and second hinge pins, respectively, configured to be compressed by the receiver strips when captured at the closed ends.

2. The system of claim 1 wherein the shroud, radial arms, and hinge pins are integrally molded.

3. The system of claim 1 wherein the receiver strips each provide an intermediate narrowing of each slot to form respective pockets at the closed ends of the slots to retain the hinge pins.

4. The system of claim 1 wherein the engine cover further comprises a fastening hole at a second end of the shroud opposite the first end, and the system further comprising:
    a releasable fastener passing through the fastening hole to selectably attach with the intake manifold body.

5. A method for attaching an engine cover, comprising:
    integrally molding an intake manifold upper body with parallel strengthening ribs having U-shaped receiver strips extending transversely from the parallel ribs to form slots;
    inserting hinge pins extending from the engine cover into the slots;
    pivoting the engine cover into abutment with the body; and
    attaching a releasably fastener to the engine cover and the body.

6. The method of claim 5 further comprising the steps of:
    covering each hinge pin with an elastomeric ferrule; and
    compressing the elastomeric ferrules when the hinge pins are inserted into the slots.

* * * * *